(12) United States Patent
Che et al.

(10) Patent No.: US 8,612,879 B2
(45) Date of Patent: Dec. 17, 2013

(54) DISPLAYING AND INPUTTING SYMBOLS

(75) Inventors: Chiwei Che, Beijing (CN); Fang Zhang, Beijing (CN); Xin Gong, Beijing (CN)

(73) Assignee: Microsoft Corporation, Redmond, WA (US)

( * ) Notice: Subject to any disclaimer, the term of this patent is extended or adjusted under 35 U.S.C. 154(b) by 239 days.

(21) Appl. No.: 13/275,754

(22) Filed: Oct. 18, 2011

(65) Prior Publication Data

US 2012/0293529 A1 Nov. 22, 2012

(51) Int. Cl.
*G06F 3/048* (2013.01)
*G06F 5/00* (2006.01)

(52) U.S. Cl.
USPC ........... 715/773; 715/702; 715/771; 345/156; 345/168; 345/171

(58) Field of Classification Search
USPC .......... 715/700, 702, 771, 773; 345/156, 168, 345/171
See application file for complete search history.

(56) References Cited

U.S. PATENT DOCUMENTS

| 5,109,352 | A   | * | 4/1992  | O'Dell       | 715/262 |
|-----------|-----|---|---------|--------------|---------|
| 6,307,541 | B1  | * | 10/2001 | Ho et al.    | 345/171 |
| 7,190,351 | B1  | * | 3/2007  | Goren        | 345/173 |
| 2004/0252035 | A1 | * | 12/2004 | Chang     | 341/28  |
| 2005/0169527 | A1 | * | 8/2005  | Longe et al. | 382/177 |
| 2009/0187399 | A1 | * | 7/2009  | O'Dell     | 704/8   |
| 2009/0225941 | A1 | * | 9/2009  | Zaiki      | 378/62  |
| 2012/0326988 | A1 | * | 12/2012 | Woo        | 345/171 |

* cited by examiner

*Primary Examiner* — Tadeese Hailu
(74) *Attorney, Agent, or Firm* — Shook, Hardy & Bacon L.L.P.

(57) ABSTRACT

Methods, systems, and computer-storage media having computer-usable instructions embodied thereon, for displaying and inputting symbols are provided. Bopomofo symbols are phonetic representations of Chinese characters. To accommodate all the Bopomofo symbols on a mobile device keyboard without sacrificing key size, the Bopomofo keys are dynamically disabled based on grammar rules and user inputs. For example, a symbol that is not eligible to follow an input symbol is disabled such that it does not distract a user searching for a symbol in the keyboard. Further, specific keys on a keyboard are dynamically replaced with tone keys once a user inputs a symbol. A user interface for displaying the symbols is, thus, consistent and easy to navigate for a user.

20 Claims, 6 Drawing Sheets

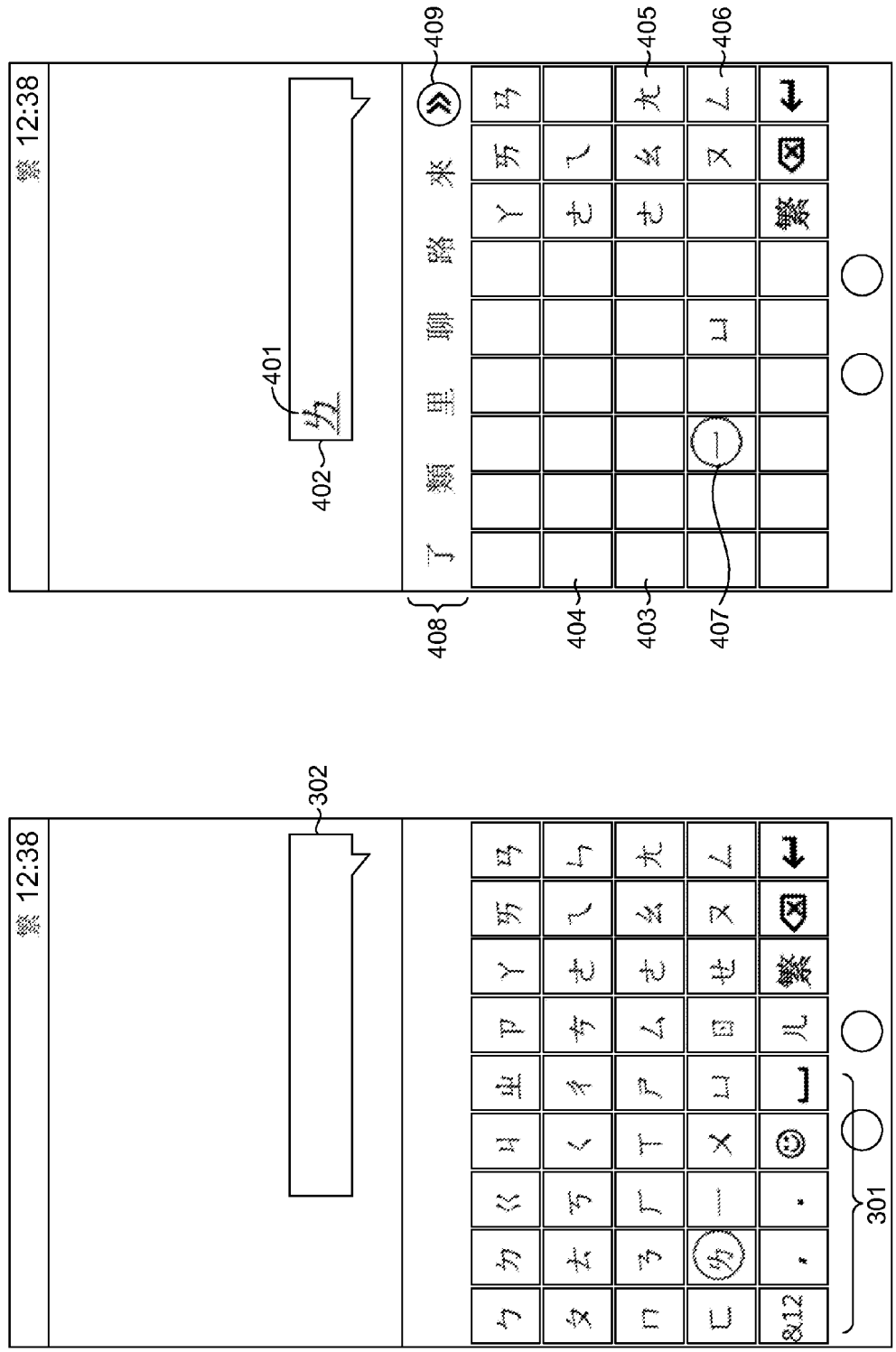

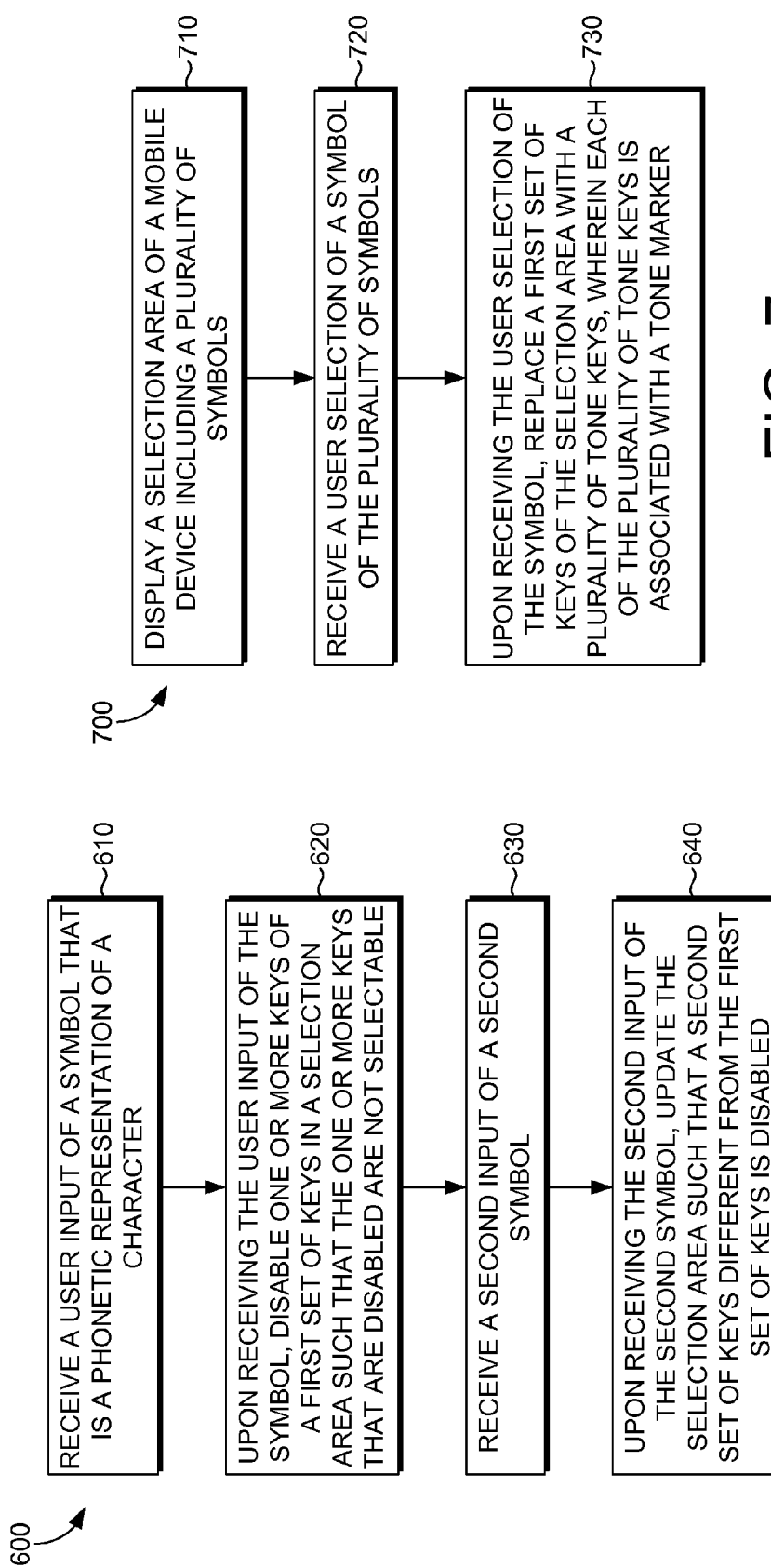

DISPLAYING AND INPUTTING SYMBOLS

CROSS-REFERENCE TO RELATED APPLICATIONS

This application claims priority to PCT Application PCT/CN2011/074399, filed May 20, 2011 and titled "Displaying and Inputting Symbols," the disclosure of which is hereby incorporated herein in its entirety by reference.

BACKGROUND

A software input panel (SIP) is a graphically rendered image of a keyboard and is widely used today as the primary interface for inputting text on a variety of mobile devices, such as mobile phones. A layout of a SIP may vary depending on location, input language, and the like. For instance, a traditional 12-key SIP may be utilized to display the western alphabet (A-Z) on a mobile device. Some languages, though, have additional letters, symbols, and the like, such that arranging all of the components onto the SIP is difficult.

In a traditional Chinese market, the mainstream SIP uses a symbol set called Bopomofo, which includes forty-two (42) basic symbols. Since there are many more symbols to associate with a key, the design of the SIP to input Bopomofo, or any other language with a large number of symbols, is difficult. The resulting SIP usually fails to accommodate a reasonable sized key for so many symbols due reducing key size to accommodate the screen size of a mobile device. With a reduced size, a user has difficulty finding and accurately selecting a specific key.

Another typical SIP display simply separates tone keys (i.e., keys that are associated with one or more tone markers of a language) from the SIP so that other keys have more room and may be larger. This results in decreased user interface consistency and an increase in a user's cognitive load.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to systems, methods, and computer storage media for, among other things, displaying and inputting Bopomofo. Bopomofo, as used herein, refers generally to a set of symbols, where each symbol is a phonetic representation of a character. In particular, Bopomofo is a set of symbols representing phonetic representations of Chinese characters. Based on traditional Chinese grammar, symbols that are invalid to be input are identified and disabled. Additionally, tone keys may dynamically replace other keys in the SIP based on an input stage of a user.

BRIEF DESCRIPTION OF THE DRAWINGS

The present invention is described in detail below with reference to the attached drawing figures, wherein:

FIG. 3 is an illustrative screen display showing an initial stage of composition, in accordance with an embodiment of the present invention;

FIG. 4 is an illustrative screen display showing a composition stage, in accordance with an embodiment of the present invention;

FIG. 6 is a flow diagram showing a method for displaying Bopomofo, in accordance with an embodiment of the present invention;

FIG. 7 is a flow diagram showing a method for displaying Bopomofo, in accordance with an embodiment of the present invention.

DETAILED DESCRIPTION

Figure 1:
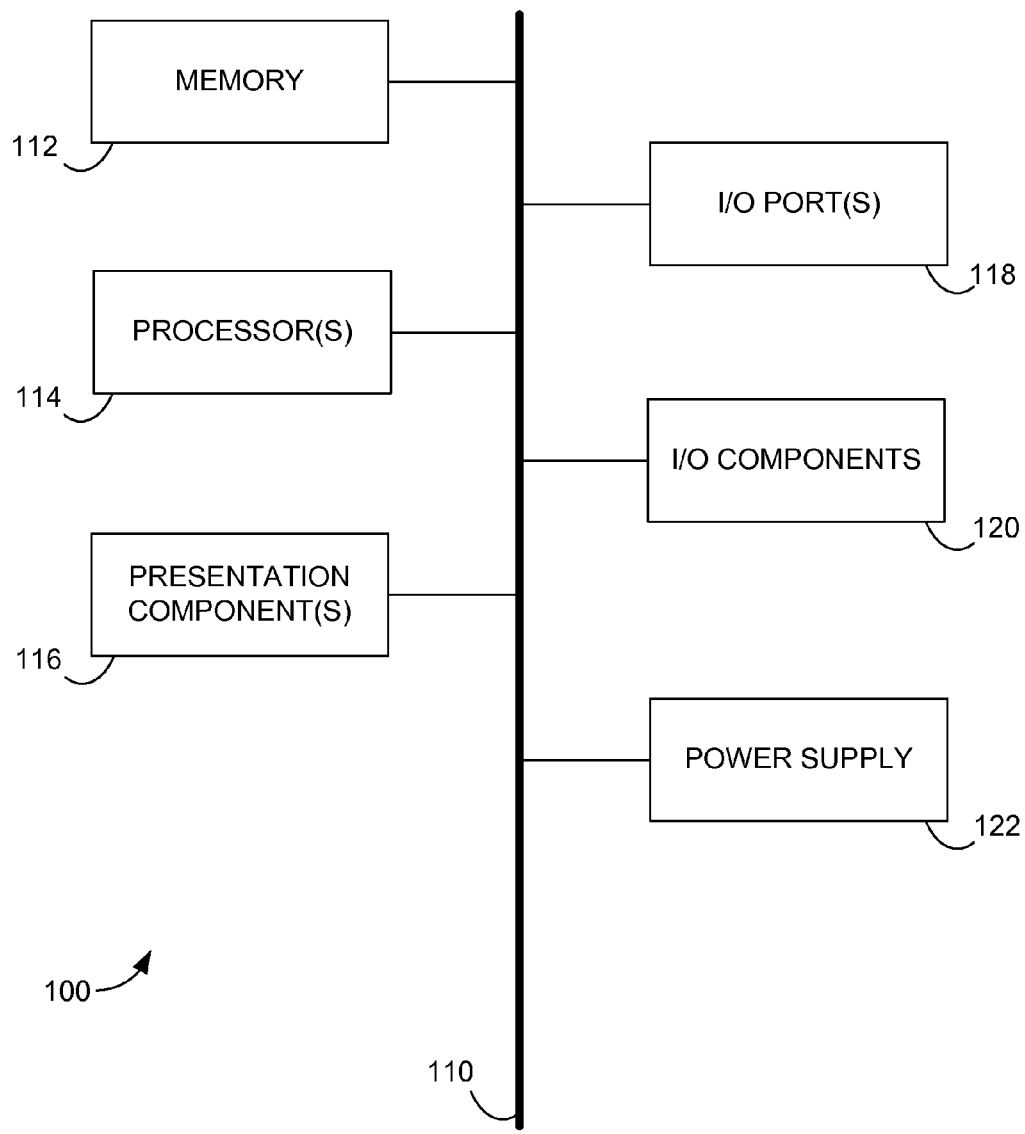
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to systems, methods, and computer storage media for, among other things, displaying and inputting Bopomofo. Bopomofo, as used herein, refers generally to a set of symbols, where each symbol is a phonetic representation of a character. In particular, Bopomofo is a set of symbols representing phonetic representations of Chinese characters. Based on traditional Chinese grammar, symbols that are invalid to be input are identified and disabled. Additionally, tone keys may dynamically replace other keys in the SIP based on an input stage of a user.

Accordingly, one embodiment of the present invention is directed to one or more computer-storage media storing computer-useable instructions that, when used by one or more computing devices, cause the computing device to perform a method for displaying and inputting symbols. The method comprises receiving a user input of a symbol that is a phonetic representation of a character. In embodiments, the symbol is a Bopomofo symbol that is a phonetic representation of a Chinese character. Upon receiving the user input of the symbol, one or more keys of a first set of keys in a selection area are disabled such that the one or more keys that are disabled are not selectable. A second input of a second symbol is received and, upon receiving the second input of the second symbol, the selection area is updated such that a second set of keys different from the first set of keys is disabled.

Another embodiment of the present invention is directed to one or more computer-storage media storing computer-useable instructions that, when used by one or more computing devices, cause the computing device to perform a method for displaying and inputting symbols. The method comprises displaying a selection area of a mobile device including a plurality of symbols. Each of the plurality of symbols is a phonetic representation of one or more characters. A user selection of a symbol of the plurality of symbols is received and, upon receiving the user selection of the symbol, a first set of keys of the selection area is replaced with a plurality of tone keys. Each of the tone keys is associated with a tone marker.

Yet another embodiment of the present invention is directed to a mobile device configured to present a user interface for displaying and inputting symbols. The mobile device comprises a processor; a memory; and a filtering engine that displays a selection area of a mobile device including a plurality of symbols, where each of the plurality of symbols is a phonetic representation of one or more characters; receive a user selection of a symbol of the plurality of symbols; upon receiving the user selection of the symbol, disable one or more symbols and replace a first set of keys of the selection area with a plurality of tone keys, where each of the tone keys is associated with a tone marker; display one or more characters that are associated with the selected symbol; receive a second user selection of at least one character of the one or more characters associated with the symbol selected; and upon receiving the second user selection of the at least one character, replace the plurality of tone keys with the first set of keys.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
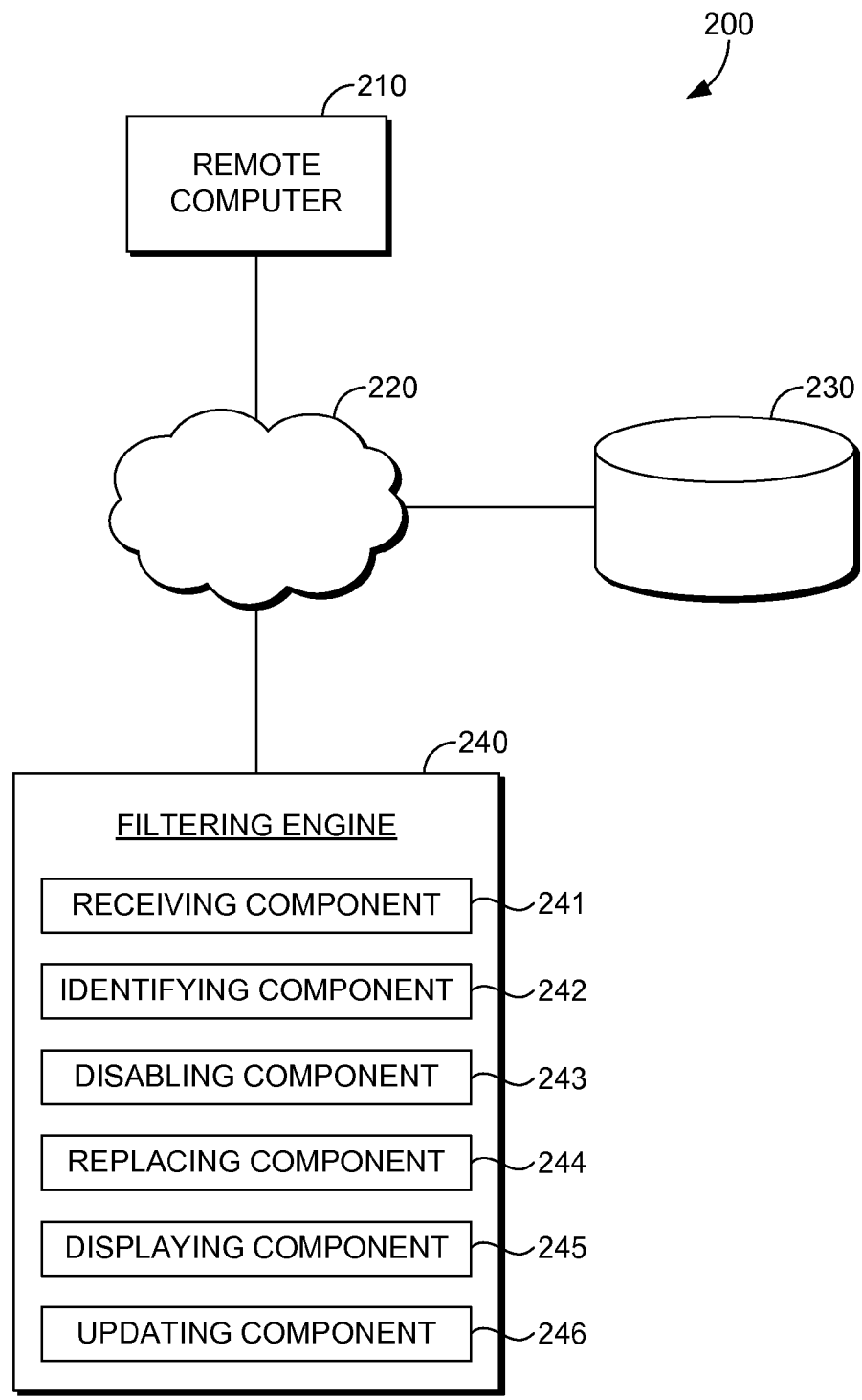
FIG. 2 is a block diagram that illustrates an environment for displaying and inputting Bopomofo, in accordance with an embodiment of the present invention.

As indicated previously, embodiments of the present invention are directed to displaying and inputting Bopomofo. Turning now to FIG. 2, a block diagram is provided illustrating an exemplary computing system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the computing system 200 generally includes a remote computing device 210, a network 220, a data store 230, and a filtering engine 240. The remote computing device 210 may include any type of computing device, such as the computing device 100 described with reference to FIG. 1, for example. The filtering engine 240 may take the form of a dedicated device for performing the functions described below, may be integrated into, e.g., the remote computing device 210, or the like. The components of the computing system 200 may communicate with each other via the network 220, which may include, without limitation, one or more local area networks (LANs) and/or wide area networks (WANs). Such networking environments are commonplace in offices, enterprise-wide computer networks, intranets and the Internet. It should be understood that any number of computing devices and ranking engines may be employed in the computing system 200 within the scope of embodiments of the present invention. Each may comprise a single device/interface or multiple devices/interfaces cooperating in a distributed environment. For instance, the filtering engine 240 may comprise multiple devices and/or modules arranged in a distributed environment that collectively provide the functionality of the filtering engine 240 described herein. Additionally, other components/modules not shown may also be included within the computing system 200.

In some embodiments, one or more of the illustrated components/modules may be implemented as stand-alone applications. In other embodiments, one or more of the illustrated components/modules may be implemented via the filtering engine 240, as an Internet-based service, or as a module inside a search engine. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of servers or client computing devices. By way of example only, the filtering engine 240 might reside on a server, cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

Generally, the computing system 200 illustrates an environment in which a SIP is modified to display and input Bopomofo. As will be described in further detail below, embodiments of the present invention provide disabling keys of the SIP, or selection area, which are invalid to be input based on grammar rules. Additional embodiments of the present invention provide dynamically updating the keys of the SIP such that keys are enabled or disabled based on a most recent input of a user. Further embodiments of the present invention provide replacing keys in the SIP with tone keys depending on a stage of composition.

The filtering engine 240 is configured to dynamically modify a SIP according to a user input. In particular, the filtering engine 240 enables or disables keys based on grammar rules and monitors the stage of composition in order to dynamically replace specific keys with tone keys.

With continued reference to FIG. 2, the filtering engine 240 includes a receiving component 241, an identifying component 242, a disabling component 243, a replacing component 244, a displaying component 245, and an updating component 246. Each of the components is configured to enable to the filtering engine 240 to modify a SIP according to a user input.

The receiving component 241 may be configured to, among other things, receive one or more user inputs of one or more symbols. In embodiments, the symbol is a Bopomofo symbol representing a Chinese character. The receiving component 241 is further configured to receive a user selection of a character. In embodiments, the user selection of a character is a selection of a Chinese character that is associated with an input symbol. For example, a user may input one or more Bopomofo symbols representing a phonetic representation of one or more Chinese characters. Based on the input symbol(s), one or more Chinese characters that are associated with the input symbol(s) may be displayed to a user for a user selection received by, for example, the receiving component 241.

The identifying component 242 may be configured to, among other things, identify stages of composition, keys to enable or disable, and identify one or more Chinese characters associated with an input symbol. A stage of composition, as used herein, refers generally to where a user is regarding inputting a symbol. Stages of composition include an initial stage and a composition stage. An initial stage, as used herein, refers generally to a stage wherein a user has not yet entered a symbol. In the initial stage, almost all symbols are enabled for user selection with the exception of tone keys. Tone keys are not displayed in the initial stage since tone markers are only used as a postfix for a complete syllable.

Once a user enters any symbol, the user has entered the composition stage. Keys to enable or disable may be identified in this stage based on the input symbol. The identifying component 242 may utilize various grammar rules to determine which keys to disable. For instance, Chinese grammar rules may be used. By way of example only, assuming a user has selected a Bopomofo symbol that is associated with a particular vowel, the identifying component 242 may identify, based on the Chinese language model, that other vowels are not eligible to follow the selected symbol.

The identifying component 242 may further identify one or more Chinese characters associated with a selected symbol. The one or more Chinese characters may be associated with the symbol based on a similar pronunciation. The one or more Chinese characters associated with the selected symbol may also include characters that are frequently selected for the input symbol, commonly used characters in the Chinese language, and the like.

Once the identifying component 242 has identified keys to disable, the disabling component 243 may disable keys associated with symbols that are not eligible to follow the selected symbol. Keys may be disabled by, for example, dimming the keys such that they appear dimmer on the SIP than keys that are enabled. By dimming keys that are not eligible to be selected, a user is able to quickly identify a desired key since they are not looking are keys that are not eligible for selection. In embodiments, disabled keys are not selectable by a user.

The disabling component 243 may be further configured to disable one or more keys each time a user inputs a symbol such that a SIP is always up to date, as will be described in detail below.

The replacing component 244 is configured to replace one or more keys from the SIP with tone keys, based on the stage of composition identified by, for example, the identifying component 242. As previously described, a device is in the initial stage prior to a user entering any symbols. As no symbols have been entered, tone keys are not required and, thus, are not displayed. Rather, function keys are displayed in the SIP. Function keys may include, but are not limited to, punctuation keys (e.g., periods, commas, capitalization, spacing, etc.), device symbols (e.g., numbers, pound signs, star signs, flash buttons, etc.), and the like.

Figure 5:
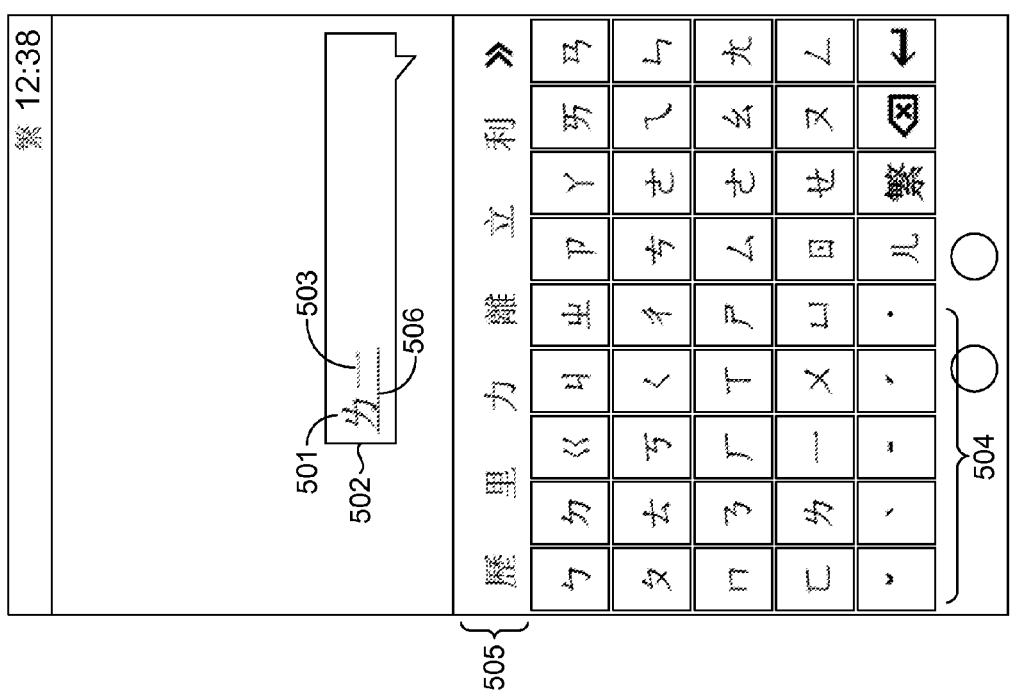
FIG. 5 is an illustrative screen display showing a second composition stage, in accordance with an embodiment of the present invention.

Once the identifying component 242 identifies a user has entered the composition stage, the function keys are replaced by the replacing component 244 with tone keys that are associated with one or more tone markers. In an embodiment, there are five (5) tone keys. As illustrated in FIGS. 3 and 5, function keys 301 are present in FIG. 3 as the user has not yet entered a symbol into the text input area 302. Once the user has inputted a symbol 501 into text input area 502, the composition stage has been entered and the function keys may be replaced with one or more tone keys 504.

The displaying component 245 may be configured to, among other things, display the SIP according to the modifications described above. For instance, the displaying component 245 displays the enabled and disabled keys, tone keys replacing function keys, one or more characters associated with the symbols, and the like.

The updating component 246 may be configured to, among other things, update the modifications described above. In particular, the updating component 246 is configured to update the enabled and disabled keys based on additional user input. For instance, assume a user inputs Symbol A that results in Keys B and C being disabled. If the user then enters Symbol D, Keys B and C may be enabled as they may be valid inputs to follow Symbol D. Additionally, keys that were previously enabled to follow Symbol A may not be eligible to follow Symbol D.

Additionally, the keys of the SIP may be updated depending on the stage of composition. As previously described, the replacing component 244 may replace function keys with tone keys in the composition stage. Once a user completes their input, the updating component 246 may communicate to the replacing component 244 that the tone keys should be replaced with the function keys.

By reducing the number of eligible keys, a user is able to quickly identify a desired symbol. Further, by replacing function keys with tone keys each time a user enters a composition stage, the user interface is consistent and, as such, a user's cognitive load is reduced.

In application, in the embodiment illustrated in FIG. 2, an initial stage of a device is illustrated in FIG. 3. In embodiments, the device is a mobile phone. The initial stage is present as a user has not yet entered a symbol into the text input area 302. Also, as the initial stage is provided, function keys 301 are displayed to a user. In this screenshot, the function keys include a period, a comma, numbers, a space bar, and an emoticon.

Once a user enters a symbol into the text input area, the composition stage takes over. As illustrated in FIG. 4, a user has entered a symbol 401 into the text input area 402. The tone keys 301 of FIG. 3 are no longer present as the user has entered the composition stage. Additionally, based on the symbol, several keys 403 and 404 associated with ineligible characters (i.e., characters that are not valid to follow the input symbol 401) have been disabled. FIG. 4 illustrates disabling keys 403 and 404 by dimming such that the disabled keys 403 and 404 are dimmer than enabled keys 405 and 406.

FIG. 4 also includes a candidate window 408 including one or more characters that are associated with the symbol 401. The characters may be commonly used characters, similar sounding characters, characters frequently used by the user, and the like. The candidate window includes an expansion indicator 409 that, upon selection thereof, navigates a user to an expanded view of the one or more characters and additional characters not present in the candidate window 408. Thus, if a character desired by a user is not present in the candidate window 408, the user may select the expansion indicator 409 to view additional characters.

A user may select additional symbols as indicated by the selected symbol 407 of FIG. 4. Once the user selects the additional symbol 407, FIG. 5 illustrates an updated display. FIG. 5 includes both selected symbols 501 and 503 in the text input area 502. As indicated in FIG. 5, the SIP has been updated such that keys that were previously disabled are now enabled. Also, FIG. 5 illustrates replacing the function keys 301 of FIG. 3 with tone keys 504.

FIG. 5 further illustrates an updated candidate window 505 including one or more characters that are associated with the input symbols 501 and 503. In FIG. 5, a user has not yet selected a character associated with the input symbols 501 and 503 as the symbols 501 and 503 are underlined as indicated by the temporary indicator 506. The temporary indicator 506 may be any designation desired by a user to indicate that text is temporary. Once a user selects a character, the temporary indicator 506 may be removed.

Referring now to FIG. 6, a flow diagram is provided that illustrates an overall method 600 for displaying and inputting symbols, in accordance with an embodiment of the present invention. Initially, as shown at block 610, a user input of a symbol that is a phonetic representation of a character is received. In embodiments, the symbol is a Bopomofo symbol that is a phonetic representation of a Chinese character. At block 620, one or more keys of a first set of keys in a selection area are disabled based on the user input of the symbol. Once the one or more keys are disabled, the disabled keys are not selectable. At block 630, a second input of a second symbol is received. At block 640, upon receiving the second input of the second symbol, the selection area is updated such that a second set of keys different from the first set of keys is disabled.

Referring now to FIG. 7, a flow diagram is provided that illustrates an overall method 700 for displaying and inputting symbols, in accordance with an embodiment of the present invention. Initially, as shown at block 710, a selection area of a mobile device is displayed and the selection area includes a plurality of symbols. The symbols, in an embodiment, are Bopomofo symbols representing a phonetic representation of a Chinese character. At block 720, a user selection of a symbol of the plurality of symbols is received. At block 730, upon receiving the user selection of the symbol, a first set of keys of the selection area is replaced with a plurality of tone keys. Each key of the plurality of tone keys is associated with a tone marker.

Figure 8:
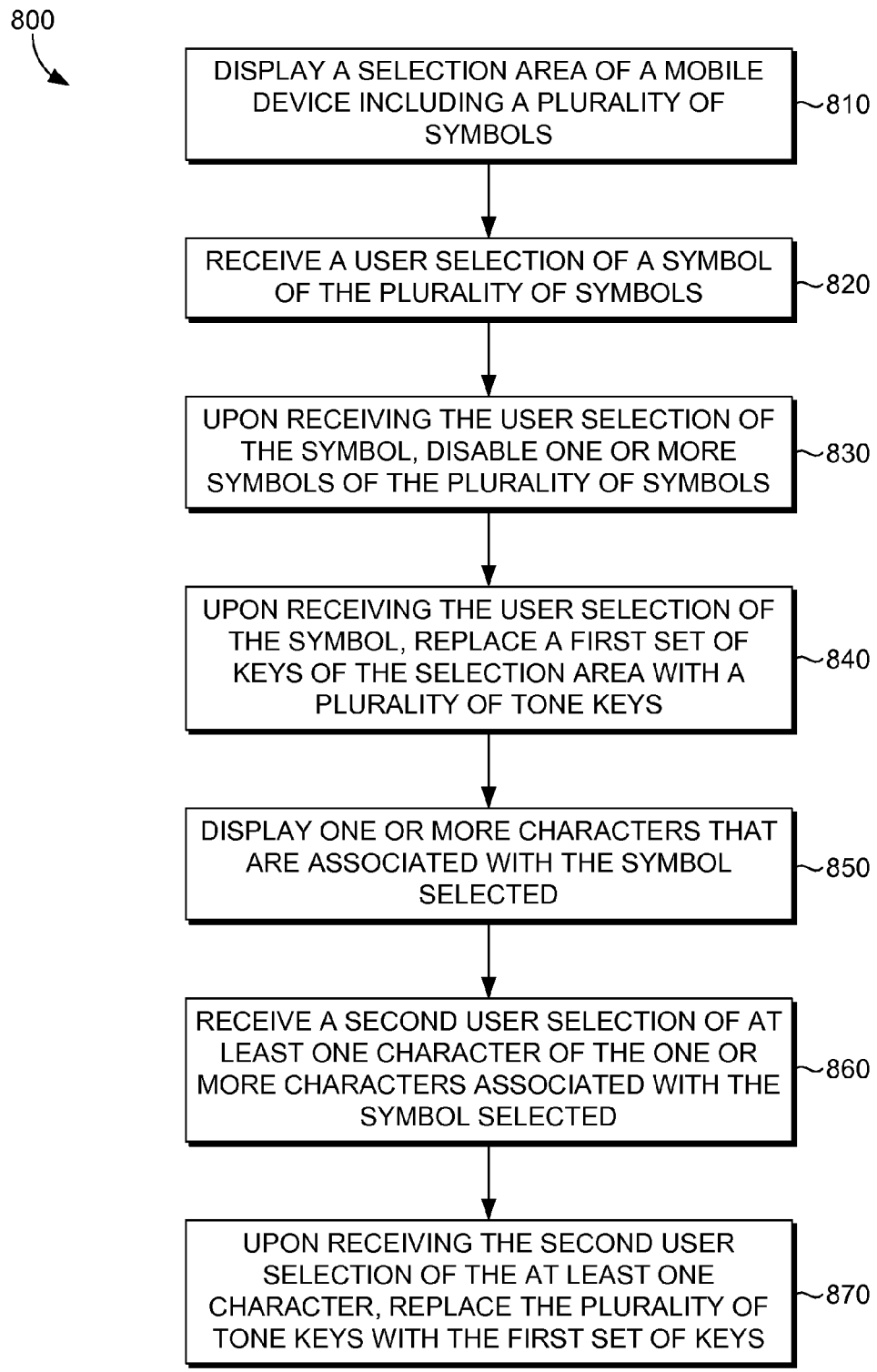
FIG. 8 is a flow diagram showing a method for displaying Bopomofo, in accordance with an embodiment of the present invention.

Referring now to FIG. 8, a flow diagram is provided that illustrates an overall method 800 for displaying and inputting symbols, in accordance with an embodiment of the present invention. Initially, as shown at block 810, a selection area of a mobile device is displayed. The selection area may include a plurality of Bopomofo symbols that are phonetic representations of Chinese characters. In an embodiment, the mobile device is a mobile phone. At block 820, a user selection of a symbol is received. At block 830, upon receiving the user selection of the symbol, one or more symbols are disabled and, at block 840, a first set of keys is replaced with a plurality of tone keys. At block 850, one or more characters that are associated with the symbol selected are displayed. At block 860, a second user selection of at least one character of the one or more characters that are associated with the symbol selected is received. At block 870, upon receiving the second user selection, the plurality of tone keys are replaced with the first set of keys.

As can be understood, embodiments of the present invention provide systems, methods, and computer-storage media having computer-usable instructions embodied thereon, for prioritizing crawl lists based on social networking rankings. Embodiments of the invention may provide social networking rankings for news users and existing users of the social networking service.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform a method, the method comprising:
   receiving a user input of a symbol, wherein the symbol is a phonetic representation of a character;
   upon receiving the user input of the symbol, disabling one or more keys of a first set of keys in a selection area such that the one or more keys that are disabled are not selectable;
   receiving a second input of a second symbol, wherein the second symbol is a phonetic representation of a second character; and
   upon receiving the second input of the second symbol, updating the selection area such that a second set of keys different from the first set of keys is disabled.

2. The one or more computer storage media of claim 1, wherein the character is a Chinese character.

3. The one or more computer storage media of claim 1, wherein the symbol is a Bopomofo symbol.

4. The one or more computer storage media of claim 1, further comprising displaying one or more characters that are associated with the input symbol.

5. The one or more computer storage media of claim 1, wherein the one or more keys of the selection area are disabled based on grammatical rules of a language.

6. The one or more computer storage media of claim 5, wherein the language is Chinese.

7. The one or more computer storage media of claim 1, wherein disabling the one or more keys includes dimming the one or more keys such that they appear lighter in the selection area than one or more keys that are enabled.

8. The one or more computer storage media of claim 1, further comprising receiving a selection of a character such that the symbol is replaced with the character in a text input area.

9. One or more computer storage media storing computer-useable instructions that, when used by one or more computing devices, cause the one or more computing devices to perform a method, the method comprising:
   displaying a selection area of a mobile device including a plurality of symbols, wherein each of the plurality of symbols is a phonetic representation of one or more characters;
   receiving a user selection of a symbol of the plurality of symbols; and
   upon receiving the user selection of the symbol, replacing a first set of keys of the selection area with a plurality of tone keys, wherein each of the plurality of tone keys is associated with a tone marker.

10. The one or more computer storage media of claim 9, wherein the character is a Chinese character of a Chinese language and the symbol is a Bopomofo symbol.

11. The one or more computer storage media of claim 9, further comprising hiding the plurality of tone keys prior to receiving the user selection of the symbol.

12. The one or more computer storage media of claim 9, wherein the first set of keys includes one or more punctuation keys, wherein a punctuation key is a key of the mobile device that is associated with one or more punctuation marks.

13. The one or more computer storage media of claim 9, wherein the mobile device is a mobile phone.

14. The one or more computer storage media of claim 9, wherein the selection area further includes one or more characters that are associated with the symbol selected.

15. A mobile device configured to present a user interface for displaying and inputting symbols, the mobile device comprising:
   a processor;
   a memory; and
   a filtering engine that
   displays a selection area of a mobile device including a plurality of symbols, wherein each of the plurality of symbols is a phonetic representation of one or more characters;
   receives a user selection of a symbol of the plurality of symbols;
   upon receiving the user selection of the symbol, disables one or more symbols of the plurality of symbols;
   upon receiving the user selection of the symbol, replaces a first set of keys of the selection area with a plurality of tone keys, wherein each of the plurality of tone keys is associated with a tone marker for the one or more characters;
   displays one or more characters that are associated with the symbol selected;
   receives a second user selection of at least one character of the one or more characters associated with the symbol selected; and
   upon receiving the second user selection of the at least one character, replaces the plurality of tone keys with the first set of keys.

16. The mobile device of claim 15, wherein the one or more characters are Chinese characters of a Chinese language and each of the plurality of symbols is a Bopomofo symbol.

17. The mobile device of claim 16, wherein the filtering engine disables the one or more symbols based on grammar rules of the Chinese language.

18. The mobile device of claim 15, wherein the filtering engine disables the one or more keys by dimming the one or more keys such that they appear lighter in the selection area than one or more keys that are enabled.

19. The mobile device of claim 15, wherein the filtering engine is further configured to, upon receiving the second selection of the at least one character, replace the selected symbol with the at least one character in a display area.

20. The mobile device of claim 15, wherein the first set of keys includes one or more punctuation keys, wherein a punctuation key is a key of the mobile device that is associated with one or more punctuation marks.

* * * * *